United States Patent [19]
Shimizu et al.

[11] Patent Number: 5,486,683
[45] Date of Patent: Jan. 23, 1996

[54] METHOD OF COOKING USING AN ELECTROMAGNETIC COOKER COVER PLATE

[75] Inventors: Tetsuo Shimizu, Yokosuka; Naoki Wakita, Yokohama, both of Japan

[73] Assignee: Nippon Petrochemicals Company, Limited, Tokyo, Japan

[21] Appl. No.: 327,149

[22] Filed: Oct. 21, 1994

Related U.S. Application Data

[63] Continuation of Ser. No. 688,097, Apr. 19, 1991, abandoned.

[30] Foreign Application Priority Data

Apr. 20, 1990 [JP] Japan .................................... 2-103012

[51] Int. Cl.⁶ ...................................................... H05B 6/12
[52] U.S. Cl. ........................ 219/622; 219/649; 428/430; 99/DIG. 14
[58] Field of Search ..................................... 219/622, 623, 219/620, 649, 464, 468, 443, 459; 126/39 H, 51; 428/325, 330, 331, 480, 1, 482, 409, 430, 689, 702, 335, 920; 106/600, 287.34; 99/DIG. 14

[56] References Cited

U.S. PATENT DOCUMENTS

| | | | |
|---|---|---|---|
| 3,637,595 | 5/1969 | Cottis et al. | 528/194 |
| 3,684,853 | 8/1972 | Welch et al. | 219/621 |
| 3,742,179 | 6/1973 | Harnden, Jr. | 219/622 |
| 4,348,571 | 9/1982 | Dills | 219/10.49 R |
| 4,552,791 | 11/1985 | Hahn | 428/35 |
| 4,626,557 | 12/1986 | Duska et al. | 530/100 |
| 4,667,011 | 5/1987 | Eckhardt et al. | 528/128 |
| 4,786,558 | 11/1988 | Sumiya et al. | 428/454 |
| 4,975,479 | 12/1990 | Sakate et al. | 524/100 |
| 5,066,767 | 11/1991 | Matzner et al. | 528/193 |
| 5,085,807 | 2/1992 | Okamoto et al. | 252/609 |
| 5,089,594 | 2/1992 | Stern et al. | 528/194 |
| 5,141,985 | 8/1992 | Asai et al. | 524/497 |
| 5,227,456 | 7/1993 | Shepherd et al. | 528/173 |

OTHER PUBLICATIONS

"Liquid Crystal Polymers", Noël & Navard, *Prog Polymer Science* vol. 16, 1991.

*Primary Examiner*—Philip H. Leung
*Attorney, Agent, or Firm*—Scully, Scott, Murphy & Presser

[57] ABSTRACT

A method of cooking edible foods by heating the foods on an electromagnetic cooker cover plate, formed by molding using a composition comprising a wholly aromatic, liquid crystalline polyester and a filler, said composition having a heat deformation temperature of not lower than 200° C. at a load of 18.5 kg/cm².

8 Claims, 1 Drawing Sheet

METHOD OF COOKING USING AN ELECTROMAGNETIC COOKER COVER PLATE

This is a continuation of application Ser. No. 07/688,097 filed on Apr. 19, 1991, now abandoned.

BACKGROUND OF THE INVENTION

The present invention relates to a dresser (also called a top plate or cover plate) for electromagnetic cookers.

Heretofore, dressers for electromagnetic cookers have been made using ceramic materials. At present, however, ceramic materials do not always possess satisfactory properties; for example, ceramic materials are apt to be cracked and to be molded. Particularly, as to moldability, ceramic materials cannot easily be formed into shapes having a holder portion or a frame portion for holding cookers such as pots and pans. Further, it is impossible effect integral molding with an outer frame or the like for engagement with a body portion, thus resulting in increase in the number of components of apparatus.

The use of a heat-resisting resin has been proposed for overcoming the above-mentioned drawbacks. As heat-resisting resins there are known silicone resins, FR-PET, polysulfone resins and polyphenylene oxide resins. Anyhow, as long as the prior art is followed, it cannot always be said that the characteristics required for the dresser are fully satisfied. Under the circumstances, a heat-resisting plastic material superior in performance has been desired.

For example, as to the dresser for an electromagnetic cooker, the following characteristics are required.

The dresser must withstand a continuous working temperature up to 200° C.

The dresser must be as thin-walled as possible and have sufficient rigidity, and when a cooking vessel is placed thereon, the dresser must fully withstand the load of the vessel and is not deformed even at a high working temperature (100°–200° C.).

When food spilled during cooking adheres to the dresser, the dresser must permits easy removal of the food so that stain does not remain thereon.

It must be possible for the dresser to be colored beautifully to match the environment.

The dresser must be flame-retardant.

It is necessary for the dresser to have sufficient electrical characteristics.

Because of these severe characteristics required, ceramic materials have mainly been used for the dresser. However, with respect to the ceramic materials so far used, the following drawbacks have been pointed out.

Molding is difficult.

Coloring cannot always be performed as desired. In some case, it has been necessary to perform the coating of a glassy material. Because of difficult molding or difficult selection of various shapes, it is not always possible to make a satisfactory design in point of a holding characteristic of pots, pans, and the like.

Care must be exercised in handling because ceramic materials are apt to be cracked.

It is the object of the present invention to provide a dresser for electromagnetic cookers capable of eliminating all of the drawbacks mentioned above.

SUMMARY OF THE INVENTION

The present invention resides in a dresser for electromagnetic cookers, formed by molding a composition comprising a wholly aromatic, liquid crystalline polyester and a filler and having a heat deformation temperature of not lower than 200° C. at a load of 18.5 kg/cm$^2$ (this load is that applied during the measurement of heat deformation temperature according to ASTM D 648 and the same load will also apply in the following in the measurement of heat deformation temperature unless otherwise described).

DETAILED DESCRIPTION OF THE INVENTION

Figure 1A:
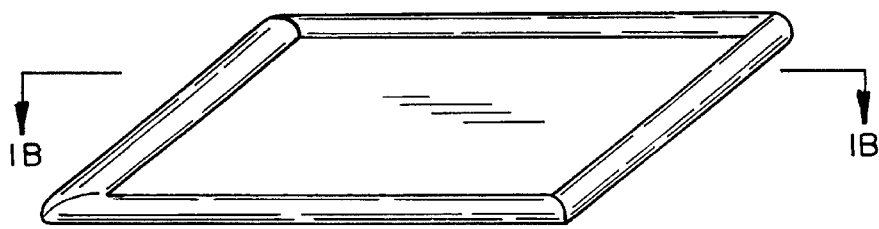
FIG. 1 is an explanatory view showing an example of a dresser for electromagnetic cookers according to the present invention.

The wholly aromatic, liquid crystalline polyester as referred to herein indicates a thermoplastic meltable polymer which exhibits optical anisotropy in a molten condition. Such a polymer exhibiting optical anisotropy in a molten condition has the property that molecular chains thereof are arranged regularly in parallel in a molten condition. The property of an optically anisotropic melt phase can be confirmed by a conventional polarization test method utilizing an orthogonal polarizer.

The wholly aromatic crystalline polyester is generally produced from a monomer which is elongated, flat, highly rigid along long molecular chains, and has a plurality of chain extension bonds either coaxial or parallel.

As examples of the above polymer which forms an optically anisotropic melt phase there are mentioned wholly aromatic polyesters and polyester ethers, and the following are mentioned as components thereof:

(A) at least one of aromatic dicarboxylic acids;

(B) at least one of aromatic hydroxycarboxylic acids;

(C) at least one of aromatic diols;

(D) at least one of aromatic dithiols, aromatic thiophenols and aromatic thiolcarboxylic acids; and (E) at least one of aromatic hydroxyamines and aromatic diamines.

In some case these compounds are each used alone, but in many cases they are used in combination, for example like (A)—(C), (A)—(D), (A)—(B)—(C), (A)—(B)—(E), or (A)—(B)—(C)—(E).

As examples of the above aromatic dicarboxylic acids there are mentioned such aromatic dicarboxylic acids as terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenylether-3,3'-dicarboxylic acid, diphenoxyethane-3, 3'-dicarboxylic acid, diphenylethane-3,3'-dicarboxylic acid, and 1,6-naphthalenedicarboxylic acid, as well as alkyl-, alkoxy-or halogen-substituted derivatives thereof such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

As examples of the aromatic hydroxycarboxylic acids (B) there are mentioned such aromatic hydroxycarboxylic acids as 4-hydroxybenzoic acid, 3-hydroxybenzoic acid, 6-hydroxy-2-naphthoic acid, and 6-hydroxy-1-naphthoic acid, as well as alkyl-, alkoxy- or halogen-substituted derivatives thereof such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxyaminebenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

As examples of the aromatic diols (C) there are mentioned such aromatic diols as 4,4'-dihydroxydiphenyl, 3,3'-dihydroxydiphenyl, 4,4'-dihydroxytriphenyl, hydroquinone, resorcin, 2,6-naphthalenediol, 4,4'-dihydroxydiphenyl ether, bis (4-hydroxyphenoxy) ethane, 3,3'-dihydroxydiphenyl ether, 1,6-naphtalenediol, and 2,2'-bis (4-hydroxyphenyl) propanebis (4-hydroxyphenyl) methane, as well as alkyl-, alkoxy- or halogen-substituted derivatives thereof such as chlorohydroquinone, methylhydroquinone, t-butylhydroquinone, phenylhydroquinone, methoxyhydroquinone, phenoxyhydroquinone, 4-chlororesorcin, and 4-methylresorcin.

As examples of the aromatic dithiols (D1) there are mentioned benzene-1,4-dithiol, benzene-1,3-dithiol, 2,6-naphthalene-dithiol, and 2,7-naphthalene-dithiol.

As examples of the aromatic thiophenols (D2) there are mentioned 4-mercaptophenol, 3-mercaptophenol, and 6-mercaptophenol.

As examples of the aromatic thiocarboxylic acids (D3) there are mentioned 4-mercaptobenzoic acid, 3-mercaptobenzoic acid, 6-mercapto-2-naphthoic acid, and 7-mercapto-2-naphthoic acid.

As examples of the aromatic hydroxyamines and aromatic diamines (E) there are mentioned 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (metylenedianiline), and 4,4'-diaminodiphenyl ether (hydroxyaniline).

The wholly aromatic liquid crystalline polyesters used in the present invention may be prepared by various ester-forming methods such as melt-acidlysis or slurry polymerization method of the above compounds.

The wholly aromatic liquid crystalline polyesters used in the present invention also include those a portion of one polymer chain is constituted by the segment of a polymer forming an anisotropic melt phase and the remaining is constituted by the segment or a thermoplastic resin forming no anisotropic melt phase. Two or more wholly aromatic liquid crystalline polyesters may also be used.

Among them, (co) polymers having at least a monomer unit having the formula:

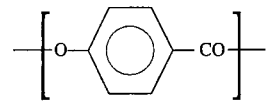

are preferably used. The content of the above monomer unit should be at least 20 mole %, preferably 30–80 mole %. The following are concrete examples of wholly aromatic polyesters preferably employable in the invention:

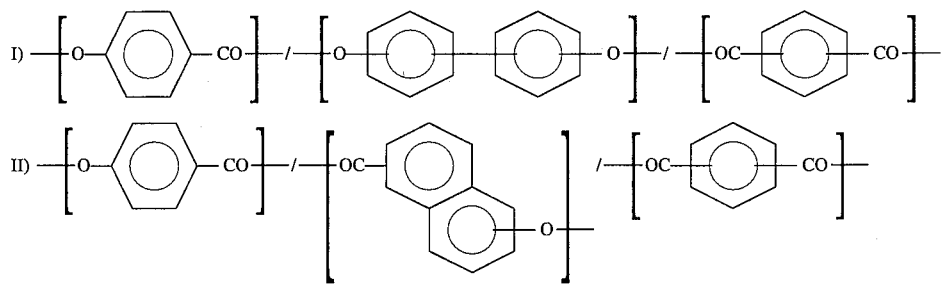

Particularly preferably, the wholly aromatic, liquid crystalline polyester is a copolymer comprising as monomer component 4-hydroxybenzoic acid, biphenol and phthalic acid.

The wholly aromatic, liquid crystalline polyester used in the present invention is high in heat resistance, possesses a sufficiently high rigidity in the temperature range of 100° to 200° C., is superior in the resistance to heat deterioration so can withstand a continuous use in the temperature range of 100° to 200° C., is little stained by food, flame-retardant, and can be colored. Besides, because the composition in question is thermoplastic, it is superior in moldability, permits the design of any shape desired, is light-weight, strong and difficult to be damaged.

Further, since the wholly aromatic, liquid crystalline polyester composition of the present invention has a high vibration damping property at high temperatures, it can diminish unpleasant metallic noises such as that generated between a pan or the like and the ceramic plate when the pan comes into contact with the dresser, and can also diminish the generation of vibration or noise from the motor used in the interior of an electromagnetic cooker. Thus, the wholly aromatic, liquid crystalline polyester has characteristics which are extremely desirable in the case of being used as a material of the dresser.

Other plastics have so far been unsatisfactory in their application to this use, but the wholly aromatic, liquid crystalline polyester used in the invention was the first to satisfy the requirements for the dresser for electromagnetic cookers.

The dresser of the present invention is not directly heated by electromagnetic waves, but since it is used in contact with a cooking pan or the like, it comes to be heated by heat conduction from the heated cooking pan. In cooking using oil, such as tempura or Japanese fry, there is a fear of the dresser temperature rising to as high as 200° C. or so. Therefore, it is essential that the composition comprising the wholly aromatic, liquid crystalline polyester and a filler in the present invention should have a heat deformation temperature of not lower than 200° C., preferably 250° C. or higher, more preferably 300° C. or higher. If the heat deformation temperature of the said composition is lower than 200° C., there may occur deformation, etc. during cooking, so the use of such composition is not suitable in the present invention.

Inorganic fillers are important and used for the improvement of processability and physical properties among the fillers of the present invention. As examples of inorganic fillers there are mentioned molybdenumdisulfide, talc, mica, clay, sericite, calcium carbonate, calcium silicate, silica, alumina, aluminum hydroxide, calcium hydroxide, graphite, potassium titanate, glass fiber, carbon fiber, and various whiskers. Above all, talc and glass fiber are preferred as inorganic fillers. The use of such filler contributes to the improvement of moldability of the composition of the present invention and strength of the dresser.

The amount of fillers used is preferably in the range of 30 to 60 wt % based on the weight of the composition. Outside this range, the resulting composition would be deteriorated in heat resistance, mechanical properties and moldability, thus making it impossible to attain the object of the present invention.

In the wholly aromatic, liquid crystalline polyester used in the invention there may be incorporated various additives within the range not departing from the gist of the invention. Examples of additives include inorganic and organic fillers, stabilizer, anti-oxidant, ultraviolet ray absorber, pigment, dye, and modifier.

Preferably, the dresser for electromagnetic cookers according to the present invention is formed through injection molding of the composition comprising the wholly aromatic, liquid crystallinepolyester. As the case may be, the outside portion of the dresser can be integrally formed with a frame portion for engagement with the body of a cooker.

The shape of the dresser is not specially limited, but preferred examples are a circular or rectangular flat plate and such a flat plate provided with a holder portion or a frame portion. By the provision of such holder portion or frame portion, not only safety is ensured during cooking, for example the displacement of the cooker used is prevented, but also there can be attained advantages in manufacture such as, for example, a reduced number of components.

The surface of the dresser of the present invention formed using a composition containing the wholly aromatic, liquid crystalline polyester can be coated with an inorganic heat-resisting coating material with a view to improving the heat resistance or the surface hardness. Examples of inorganic heat-resisting coating materials employable in the invention include those consisting principally of inorganic high-molecular resins containing silicon dioxide as a main component, and ceramic coating agents. It is sufficient for the resin used in the invention to be coated with any of such heat-resisting coating materials at a thickness in the range of 10 to 50 μm. By this coating, improvement can be attained not only in the heat resistance and surface hardness of the dresser but also in the resistance to chemicals, to water and to stain. Thus, the object of the present invention can be fully achieved.

EXAMPLES

The following examples are given to illustrate the present invention more concretely.

EXAMPLE 1

Figure 1B:

There was prepared a compound (heat deformation temperature at a load of 18.5 kg=290° C. measured according to ASTM D 628) comprising as the wholly aromatic, liquid crystalline polyester a terpolymer (2:1:1) of 4-hydroxybenzoic acid, biphenol and terephthalic acid as well as 25 wt % of glass fiber and 25 wt % of talc. Using this compound, a dresser for electromagnetic cookers provided with a frame and having a flat plate-like shape 2.5 mm in thickness, as shown in FIG. 1, was formed by injection molding using an injection molding machine.

Figure 2:
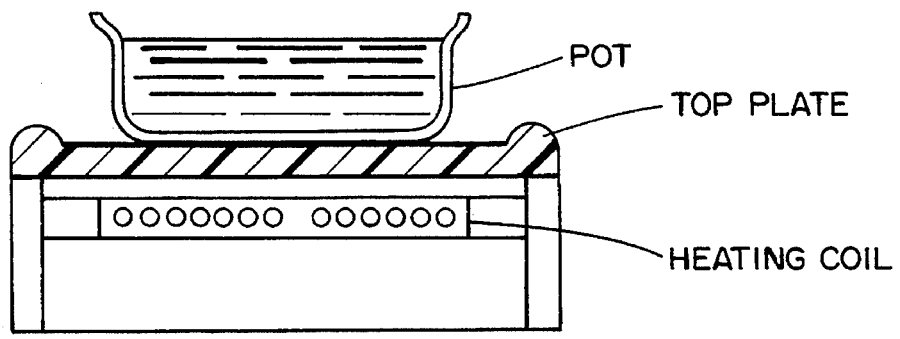
FIG. 2 is a sectional view showing an example of an electromagnetic cooker using the dresser.

The dresser was assembled for an electromagnetic cooker like that illustrated in FIG. 2. Using this electromagnetic cooker, water in a pot at room temperature was heated to boil. During this period, no unpleasant sound was made and a good heating performance was exhibited.

EXAMPLE 2

A test was conducted to check the stain of the materials of a dresser. A test piece (2 mm thick×16 cm long×2 cm wide) was formed by injection molding from just the same compound of the wholly aromatic, liquid crystalline polyester (containing 25 wt % glass fiber and 25 wt % talc) as that used in Example 1. The test piece was then put into a commercially available curry and held at 100° C. for 1 hour. Thereafter, the curry was cooled to room temperature and the test piece was kept immersed therein for 19 hours.

Then, the test piece as taken out from the curry, water-washed using cloth and observed. A comparison was made between the surface of the test piece immersed in the curry and that of another like test piece not immersed therein. As a result, there was recognized little difference between the two. The test piece immersed in the curry was little discolored.

COMPARATIVE EXAMPLE 1

There was conducted a staining property test in the same way as in Example 2 except that test pieces comprising commercially available polysulfone resin and polyphenylene oxide resin were used in place of the test piece comprising the wholly aromatic, liquid crystalline polyester. As a result, with respect to both resins, the surfaces of the test pieces immersed in the curry were somewhat yellowed and thus there was recognized stain caused by curry.

EXAMPLE 3 AND COMPARATIVE EXAMPLE 2

Using the resins described in Example 2 and Comparative Example 1, test pieces were formed according to ASTM-D790. Then, a comparison was made with respect to rigidity in terms of flexural modulus of those test pieces at room temperature and also at 200° C. The values obtained were 136,000; 77,300; and 75,000 kg/cm$^2$ at room temperature and 75,000; 7,300; and 6,800 kg/cm$^2$ at 200° C. with respect to the wholly aromatic, liquid crystalline polyester, polysulfone resin and polyphenylene oxide resin, respectively.

It turned out that the rigidity of the polysulfone resin and that of the polyphenylene oxide resin at 200° C. were not satisfactory.

EXAMPLE 4

The surface of the dresser formed using the wholly aromatic, liquid crystalline polyester composition in Example 1, like that illustrated in FIG. 1, was coated with an inorganic heat-resisting coating material containing an alkali metal silicate as a binder, and then the thus-coated dresser was heat-treated at 280° C. for 1 hour. The dresser thus heat-treated was superior in scratch strength, and when checkers were formed thereon at intervals of 1 mm using a razor and a cellophane tape peeling test was conducted, but no abnormal condition was recognized. The surface hardness was 8 H as pencil hardness and thus was very high.

EXAMPLE 5

A dresser for electromagnetic cookers of the same shape as that prepared in Example 1 was formed by injection molding in the same way as in Example 1 except that a compound (heat deformation temperature at 18.5 kg load= 240° C.) comprising as the wholly aromatic, liquid crystalline polyester a terpolymer of 4-hydroxybenzoic acid, 6-hydroxy-2-naphthoic acid and terephthalic acid (molar ratio= 15:70:15) and 30 wt % of glass fiber was prepared and used. The dresser was assembled as a dresser for an electromagnetic cooker and subjected to the same test as in Example 1. During the test, there was made no specially unpleasant sound, and a good heating performance was exhibited.

COMPARATIVE EXAMPLE 3

Water contained in a pot was boiled in the same manner as in Example 1 except that a dresser formed using a flat glass plate (thickness: 3.8 mm) in place of the wholly aromatic, liquid crystalline polyester composition (containing 25 wt % glass fiber and 25 wt % talc) was used. There was made an unpleasant sound caused by rubbing between the pot and the dresser.

EXAMPLE 6

Figure 3:
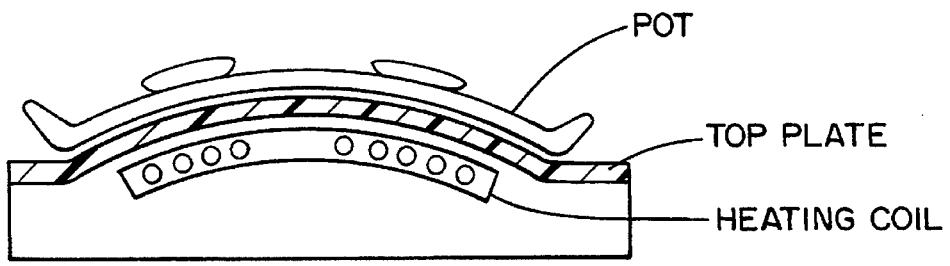
FIG. 3 is a sectional view showing an example of a dresser for electromagnetic cookers having a different shape according to the present invention.

Such a curved dresser (thickness: 2.5 mm) for electromagnetic cookers as shown in FIG. 3 was fabricated in the same manner as in Example 1 except that a wholly aromatic, liquid crystalline polyester composition (containing 40 wt % of glass fiber and 10 wt % of a gypsum-based filler; heat deformation temperature: 316° C. @18.5 kg) different in the kind and amount of fillers used. Cooking was performed using a pot which was also curved in conformity with the dresser. During the cooking, a good heating condition was exhibited and there was no special trouble.

The dresser for electromagnetic cookers according to the present invention can afford the following effects.

There is scarcely any vibration or unpleasant sound even at a high temperature during cooking.

Superior in the anti-staining property at a high temperature during cooking.

As compared with ceramic materials, a wholly aromatic, liquid crystalline polyester composition permits the reduction in thickness and weight, and the dresser formed of such composition is difficult to be cracked.

Because of good moldability, a relatively free shape of design, e.g. a curved shape, can be effected, and the dresser can be formed integrally with a frame or the like.

The anti-staining property, etc. can be further improved by coating of a heat-resisting coating material.

Since the thickness of the dresser can be made smaller than that of ceramic dressers, it is possible to improve the thermal efficiency.

What is claimed is:

1. A method of cooking edible liquid and solid foods comprising the steps of:

placing an edible liquid and/or solid food in a cookware article;

induction heating said food in said cookware article on an electromagnetic cooker cover plate, said cover plate formed by injection molding a polymeric composition, said composition comprising a wholly aromatic, liquid crystalline polyester and an inorganic filler, wherein said cover plate has a heat deformation temperature of at least 200° C. under a load of 18.5 kg/cm$^2$ whereby vibration and other noises generated during said cooking step are diminished.

2. A method in accordance with claim 1 wherein said wholly aromatic, liquid crystalline polyester is a copolymer containing a monomeric unit having the formula

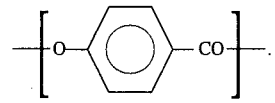

3. A method in accordance with claim 1 wherein said wholly aromatic, liquid crystalline polyester is a copolymer containing the monomeric components: 4-hydroxybenzoic acid, biphenol and phthalic acid.

4. A method in accordance with claim 1 wherein said inorganic filler is present in an amount of between 30% and 60% by weight, based on the total weight of said polymeric composition.

5. A method in accordance with claim 4 wherein said inorganic filler comprises talc and/or glass fibers.

6. A method in accordance with claim 1 wherein said cover plate is provided, at an outer portion thereof, with a frame member for holding said cooker.

7. A method in accordance with claim 1 wherein said cover plate is provided, at an outer portion thereof, with a frame for engaging with the body of said cooker, said frame being formed integrally with said cover plate.

8. A method in accordance with claim 1 wherein said cover plate is coated with an inorganic heat-resistant coating material.

* * * * *